(12) United States Patent
Raghuveer

(10) Patent No.: US 10,217,127 B2
(45) Date of Patent: Feb. 26, 2019

(54) COMPUTERIZED SYSTEMS AND METHODS FOR DETERMINING PERFORMANCE OF CONTENT IN EMAIL

(71) Applicant: OATH INC., New York, NY (US)

(72) Inventor: Aravindan Raghuveer, Karnataka (IN)

(73) Assignee: OATH INC., New York, NY (US)

( * ) Notice: Subject to any disclaimer, the term of this patent is extended or adjusted under 35 U.S.C. 154(b) by 473 days.

(21) Appl. No.: 13/946,047

(22) Filed: Jul. 19, 2013

(65) Prior Publication Data

US 2015/0025959 A1 Jan. 22, 2015

(51) Int. Cl.
*G06Q 30/02* (2012.01)

(52) U.S. Cl.
CPC .................... *G06Q 30/0245* (2013.01)

(58) Field of Classification Search
CPC . G06Q 30/0245; G06Q 30/0242; G06Q 30/02
USPC ............ 705/14.4, 14.42, 14.52; 700/90; 358/462; 709/206
See application file for complete search history.

(56) References Cited

U.S. PATENT DOCUMENTS

| | | | |
|---|---|---|---|
| 2003/0212745 A1* | 11/2003 | Caughey | 709/206 |
| 2006/0190107 A1* | 8/2006 | Kassar et al. | 700/90 |
| 2007/0008574 A1* | 1/2007 | Henry et al. | 358/1.15 |
| 2010/0114655 A1* | 5/2010 | D'Elia | G06Q 30/02 705/14.52 |
| 2014/0012659 A1* | 1/2014 | Yan | 705/14.42 |
| 2014/0214995 A1* | 7/2014 | Zlatokrilov | G06Q 10/107 709/206 |

* cited by examiner

*Primary Examiner* — Marilyn G Macasiano
(74) *Attorney, Agent, or Firm* — James J. DeCarlo; Greenberg Traurig, LLP

(57) ABSTRACT

Enabling advertisers to evaluate performance of an email advertisement campaign is disclosed. An advertisement is circulated via email among the users of an email system and feedback associated with one or more of user actions or automated actions by the email system with respect to the circulated advertisement are detected. The feedback is analyzed to determine the performance of the email advertisement campaign across various user segments. Informative reports regarding the feedback are generated and provided to the advertiser for a charge by the email system provider.

20 Claims, 10 Drawing Sheets

COMPUTERIZED SYSTEMS AND METHODS FOR DETERMINING PERFORMANCE OF CONTENT IN EMAIL

BACKGROUND

The Internet provides for instantaneous communications via various modalities such as email, voice and videos. Emails or electronic mail is a system for exchanging messages via a digital communication network from one sender to one or more recipients. The email system is very useful for commercial establishments to provide information regarding their goods and services to each particular user of a plurality of users. As the volume of advertisements sent via email increased rapidly, users are overwhelmed with the quantity of information they receive.

SUMMARY

This disclosure relates to systems and methods for monetizing email in a manner that is advantageous to the email provider, the advertiser and the user. The disclosure facilitates email providers to charge advertisers when they use a certain email system for their advertisement campaign in return for providing reports detailing the performance of the campaign among various user segments. A processor executable method is disclosed in accordance with one embodiment.

The method involves providing, by a processor, an advertisement of an advertiser via email to a plurality of users of an email system, detecting feedback associated with the advertisement, the feedback comprising a classification by the email system of emails comprising the advertisement in each email account of the plurality of users. The plurality of users are also classified into a plurality of user segments based on their common attributes. The feedback associated with the advertisement is analyzed by the processor to identify respective feedback of each of the plurality of user segments. Reports mapping the feedback to the respective attributes of the user segments are generated and provided to the advertiser. The method also involves the processor receiving revenue from the advertiser for the generated reports. In an embodiment, a unique id is also generated for the advertisement and inserted into the advertisement such that each of the emails sent to the plurality of the users comprises the unique id. The processor also detects respective folder in each user's email account that the advertisement is automatically placed into by the email system upon receipt. In an embodiment, detecting the feedback further comprises, detecting at least one user action by at least one of the plurality of users.

In an embodiment, wherein the plurality of users are a subset of the users of the email system that are to receive the advertisement, the processor further determines if at least one key performance indicator (KPI) associated with the advertisement equals or exceeds a performance threshold. If the key performance indicator does not equal or exceed the threshold, the method further comprises receiving, by the processor, a modified version of the advertisement, transmitting the modified version to the plurality of users and collecting feedback for the modified version from the plurality of users. If the at least one key performance indicator equals or exceeds the threshold for the modified version, the method further comprises transmitting, by the processor, the modified version to the users of the email system that are to receive the advertisement.

A computing system comprising at least one processor, a storage medium for tangibly storing thereon program logic for execution by the processor is disclosed in an embodiment. The program logic comprises ad providing logic, executed by the processor, for providing an advertisement of an advertiser via email to a plurality of users of an email system; feedback detecting logic, executed by the processor, for detecting feedback associated with the advertisement, the feedback comprising a classification by the email system of emails comprising the advertisement in each email account of the plurality of users; segment identifying logic, executed by the processor, for identifying a plurality of user segments from the plurality of users; analyzing logic, executed by the processor, for analyzing the feedback associated with the advertisement to identify respective feedback associated with each of the plurality of user segments; report generating logic, executed by the processor, for generating reports mapping the respective feedback with respective attributes of the plurality of user segments; and reports providing logic, executed by the processor, for providing the generated reports to the advertiser.

The system also comprises generating logic, executed by the processor, for generating a unique id for the advertisement; and id inserting logic, executed by the processor, for inserting the unique id into the advertisement such that each of the emails sent to the plurality of the users comprises the unique id. In an embodiment, detecting classification of the email further comprises folder detecting logic, executed by the processor, for detecting a respective folder in each user's email account that the advertisement is automatically placed into by the email system upon receipt. In an embodiment, revenue receiving logic is executed by the processor, for receiving revenue from the advertiser for the generated reports.

A computer readable storage medium comprising processor-executable instructions is disclosed in an embodiment. The instructions when executed by the processor cause the processor to provide an advertisement of an advertiser via email to a plurality of users of an email system, and detect feedback associated with the advertisement, the feedback comprising a classification by the email system of emails comprising the advertisement in each email account of the plurality of users. The instructions further cause the processor to identify a plurality of user segments from the plurality of users, analyze the feedback associated with the advertisement to identify respective feedback of each of the plurality of user segments, generate and provide to the advertiser reports mapping the respective feedback with attributes of the user segments and receive revenue from the advertiser for the generated reports.

In an embodiment, the computer readable medium further comprises instructions that cause the processor to generate a unique id for the advertisement, insert the unique id into the advertisement such that each of the emails sent to the plurality of the users comprises the unique id, detect a respective folder in each of the users' email account that the advertisement is placed into automatically by the email system upon receipt. In an embodiment, the computer readable medium also comprises instructions that cause the processor to detect user actions.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
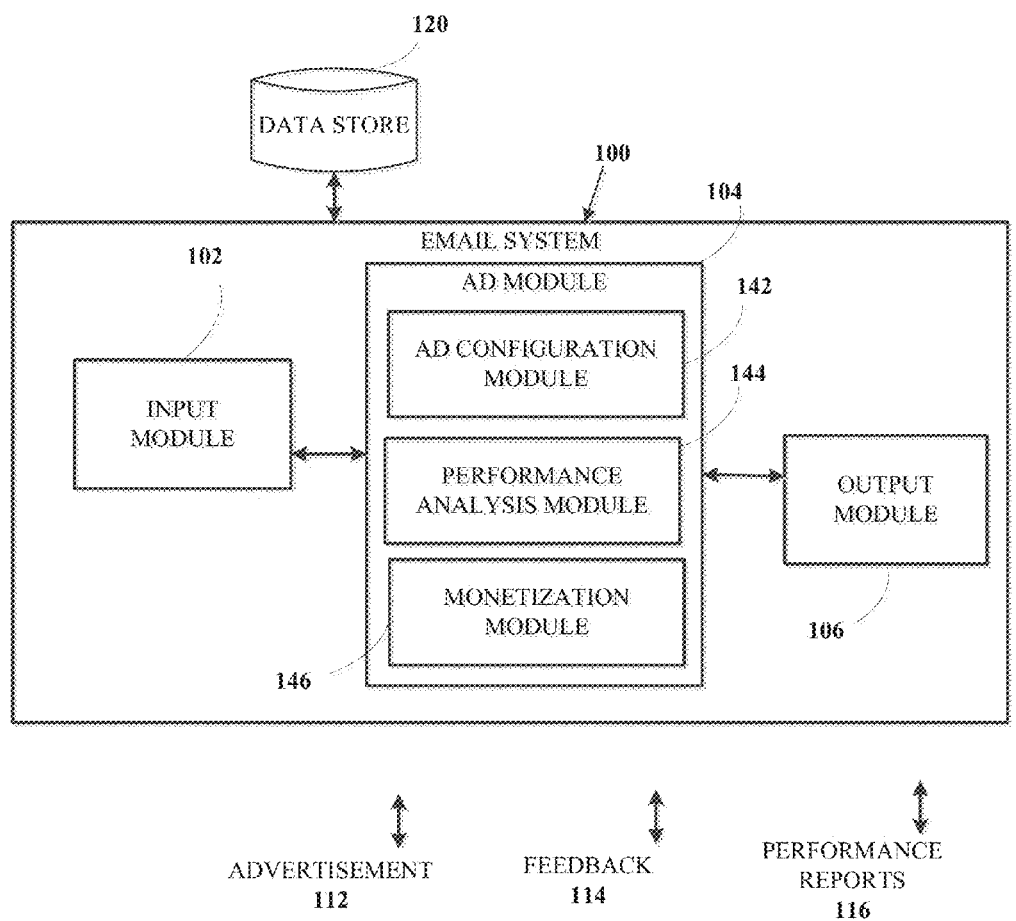
FIG. 1 shows an email system that is configured provide an advertisement to various users and collect feedback in accordance with an embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Advertisers use many modes of communication to provide information regarding their products and services to the users. With the emergence of the digital communication networks such as the Internet, email (or Electronic mail) has gained prominence as another mode of marketing. Email systems enable advertisers to simultaneously transmit a message to individual accounts of a plurality of users. In fact, the advertisement conveyed to a user's email account can include some basic customization based on known user attributes such as the user's name/nickname or the user's location. Email advertising also carries certain disadvantages to the advertisers as detailed infra.

When an email is received at a user's email account, it is normally classified into the user's inbox with an indication that it yet to be read by the user. However, due to the overwhelming number of emails received by the users, email providers have introduced mechanisms wherein the emails are screened so that only emails that are of interest to the user reach the user's inbox while those emails that are sent out in bulk and are deemed not to be of interest to the user are moved to the spam/bulk folder for later perusal by the user. This can be especially true for the emails sent out by the advertisers in bulk. In some instances the users may not view their bulk emails at all and such emails are automatically deleted upon passage of certain time period. It is a disadvantage to the advertisers to have their emails deleted in this manner because their advertisement does not garner the user's attention even as it consumes the resources of the email provider. For the email provider who maintains the server and communication resources for hosting the user's email account, accumulation and maintenance of such bulk/junk email in users' email accounts leads to wastage of resources as neither the users nor the advertisers pay the email provider for the email services. In fact, a potential downside exists that the users can consider such email messages as an inconvenience which causes a negative impression of the advertiser with the user. Therefore, it is advantageous to the user, the advertiser and the email provider if an advertiser is better able to target the user segments for a particular advertisement. This is possible if the advertiser can get feedback regarding the users who find the advertisement useful and the users who may consider the advertisement to be an inconvenience.

Various embodiments disclosed herein relate to systems and methods of providing feedback to advertisers regarding the performance of their email ad campaigns without compromising the users' privacy. This facilitates the advertiser to better target audience for a given ad campaign. It is advantageous to the users as they receive emailed advertisements that are more appropriate to their preferences and hence generate less spam in the email accounts. It is also advantageous to the email providers as it permits them to monetize the information they possess by virtue of maintenance of the users' email accounts by charging the advertisers for the feedback. The feedback can be generalized across user segments or user buckets so that rather than individual user information, information regarding how the advertisement was received across a user segment having a particular profile is passed on to the advertiser by the email provider for monetization thereby protecting user privacy.

Turning now to the figures, FIG. 1 shows an email system 100 configured to provide an advertisement to various users of the email system 100 and collect feedback regarding the emailed advertisement from the various users. The collected feedback is generalized across the various defined user buckets and provided to an advertiser associated with the emailed advertisement. The email system 100 comprises an input module 102, an ad module 104 and an output module 106. The input module 102 receives an advertisement 112 from an advertiser for transmission to a plurality of users (user accounts) of the email system 100. The advertisement 112 can comprise one or more of text, images, audio and video. In an embodiment, the plurality of users can include all the users of the email system 100. In an embodiment, the plurality of users can be a randomly selected subset of the email system users. In an embodiment, the plurality of users can be selected based on their conformance to a pre-defined profile either as specified by the advertiser or as identified by the email system 100. For example, various segments can be recognized from the users of the email system 100 such as but not limited to those users who reside in a particular geographic locale, or users satisfying certain demographic criteria, or users who are observed to exhibit particular behavioral patterns (regardless of their local/demographic details).

The advertisement 112 thus received from the advertiser is processed by the ad configuration module 142 comprised within the ad module 104 for transmission to the plurality of users whose information can be retrieved from a data store 120 associated with the email system 100. The advertisement 112 thus processed is communicated to the output module 106 for transmission to the plurality of users. In an embodiment, the advertisement 112 is configured as an email message (ad email) for transmission to the plurality of users. The feedback 114 associated with the transmitted ad email 112 is received by the input module 102 and communicated to the performance analysis module 144. The received feedback can include voluntary user actions such as but not limited to, opening the ad email message 112, viewing/reading the email including the advertisement 112, moving the ad email 112 to a folder, deleting the ad email 112 or classifying it under a user-defined or system defined category folders. The received feedback 114 can also comprise automatic actions taken by the email system 100 on the received ad email 112 based on predetermined rules for the user as detailed further infra.

The performance module 144 is configured to analyze the received feedback 114 and generate reports 116 for presentation to the advertiser. The generated reports 116 are communicated to the output module 106 that transmits the reports 116 to the advertiser. In an embodiment, the reports can include information such as but not limited to how many users actually opened and saw the advertisement 112, the time spent by the users with the advertisement 112, the percentage of the ad email 112 that directly went to spam. As no user specific information is disclosed by the email system 100 to the advertiser via the generated reports 116, the privacy of the users is preserved.

Based on the received reports 116, the advertiser can determine the trends in the performance of the advertisement with various user buckets. Various key performance indicators (KPI) as detailed herein can be employed by the advertiser to determine if the performance of the transmitted advertisement 112 with a group of users/user bucket/user segment is good or if it warrants improvement in which case, the advertisement 112 can be changed to increase its appeal to the targeted user buckets.

The ad module 104 additionally comprises a monetization module 146 that facilitates the provider maintaining the email system 100 to charge for and collect fee from advertisers for the services provided. Various monetization models that are currently know or to be known can be implemented by the monetization model 146. For example, an advertiser can be charged per advertisement with feedback collected for a certain period and for a certain number of reports or the advertiser can be charged periodically or the advertiser can be charged per report especially if the report is a non-standard or custom report generated for particular criteria as specified by the advertiser or determined by a provider associated with the email system 100.

Figure 2:
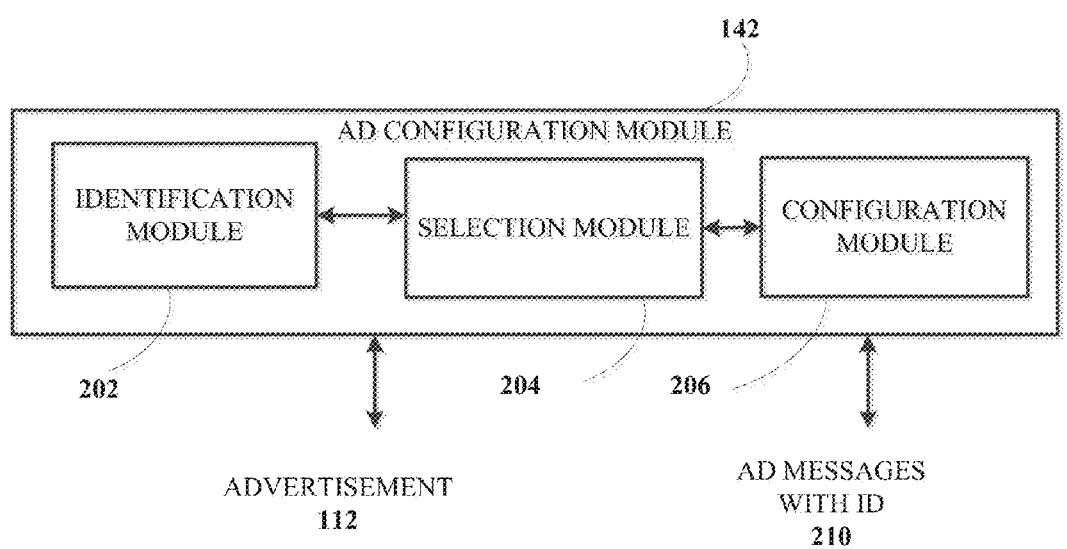
FIG. 2 is a schematic diagram showing further details of the ad configuration module in accordance with an embodiment.

FIG. 2 is a schematic diagram showing further details of the ad configuration module 142. The ad configuration module 142 further comprises an identification module 202, a selection module 204 and a configuration module 206. As discussed supra, the received advertisement 112 is prepared for transmission to the plurality of users by the ad configuration module 142. In particular, an advertiser signs on with the email system 100 to receive ad analytics/reports in accordance with embodiments described herein. The advertiser can further provide one or more advertisements that are to be transmitted to the users in accordance with embodiments described infra. Each new advertisement received by the ad configuration module 142 is assigned a unique ID by the identification module 202. In an embodiment, the ID assigned to a particular advertisement can be indicative of various identifying indicia of the advertisement such as but not limited to, the particular advertiser, the date on which it was first received, whether the ad is being reused from a prior campaign, or if it is customized to particular user buckets.

In an embodiment, the information associated with the advertisement 112 received from the user can be communicated to the selection module 204 in order to select those users to whom the advertisement 112 will be transmitted. In an embodiment, all the users of the email system 100 can be selected by the selection module 204. Generally the user selection criteria can be provided by the advertiser. In an embodiment, the advertiser can specify particular user profiles that are to receive the advertisement 112. Accordingly, the selection module 204 will select those users whose profiles satisfy the advertiser's criteria. It may be noted herein that as the email users' information is not provided to the advertiser, only broad user profile information such as gender, demographic and/or location or other such general attributes can be provided by the advertiser. As the email system 100 receives such information from the users at the time when the users' sign up for their email accounts, the advertiser's criteria can be compared to the user attributes stored for example, in the data store 120. Those users with matching attributes can be picked by the selection module 204 to receive the advertisement 112. The information regarding the selected users can be transmitted to the configuration module 206 in accordance with one embodiment. The configuration module 206 generates email messages 210 to be send to the various users, each message including the received advertisement 112 along with the generated ID. The messages thus generated by the configuration module 206 are transmitted by the output module 106 to the selected users.

Figure 3:
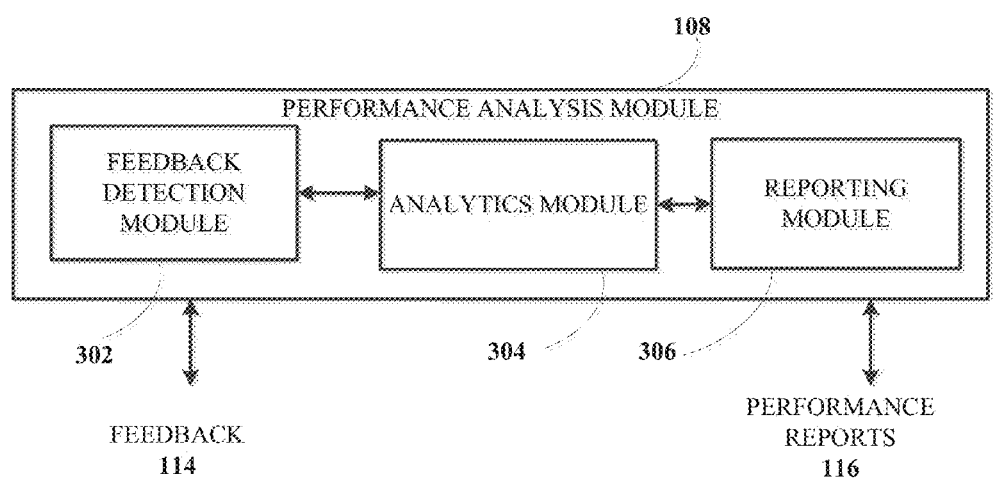
FIG. 3 is a schematic diagram showing further details of the performance module in accordance with an embodiment.

FIG. 3 is a schematic diagram showing further details of the performance module 144. The performance module 144 comprises a feedback detection module 302, analytics module 304 and a reporting module 306. The performance module 144, as described supra, is configured to receive the feedback associated with the messages 210 that were transmitted to the various email accounts of the users. As the messages 210 are transmitted only to the users having email accounts with the provider of the email system 100 as opposed to external providers, the feedback detection module 202 can access the email account information of each of the users who received the messages 210 to detect the status of the messages 210 in each receiving user's email account. In an embodiment, the status information of the messages 210 can be obtained from user logs storing activity data associated with the receiving users. Therefore, the feedback detection module 302 does not require explicit actions from the receiving users to detect their respective feedback associated with the ad messages 210. Rather, it can also detect the feedback associated with automatic actions taken by the email system 100. For example, the feedback detection module 302 can detect if the messages 210 went directly into the spam folders or other system-defined folders or if they were otherwise acted upon by a receiving user. For example, based on the user log information, the feedback detection module 302 can detect that a user spent three minutes reading the email message 210 and then classified it elsewhere or that a user spent less than a minute of the email 210 before deleting it. For each receiving user, the user's respective actions or system actions on the email message 210 are collected by the feedback detection module 302 and transmitted to the analytics module 304 for further analysis.

The analytics module 304 obtains the feedback in addition to the related user information, such as the respective email ids associated with the feedback from the feedback detection module 302. In an embodiment, the analytics module 304 can also obtain user information from the data store 120. For example, based on the email id obtained from the logs by the feedback detection module 302, the analytics module 304 can retrieve other user information such as but not limited to, the user's demographic profile like age, gender, geographic location and behavioral patterns from user information from the data store 120. In an embodiment, the analytics module 304 can be further configured to automatically generate reports for certain standard predefined user segments. In an embodiment, the standard reports that are generated can be associated with a certain monetization model agreed upon by the provider of the email system 100 and the advertiser. For example, the analytics module 304 can generate reports for one or more of gender, location, age, educational qualification or other user attributes. Thus, the analytics module 304 can generalize the retrieved data across user segments so that user-specific information is not passed on to the advertiser.

The analytics module 304 can also receive input comprising queries regarding the type of information that is desired. In an embodiment, the advertiser requires custom reports by specifying certain criteria or key performance indicators (KPI) that are desired to be examined. If the requisite information is not already available, the analytics module 304 can be configured to request the information from one or more of the feedback detection module 302 or the data store 120. The analytical module 304 thus provides a set of KPI that is indicative of how the email campaign performed. In an embodiment, the set of KPI can include but is not limited to, and the percentage of users that delete the email within five minutes of viewing, percentage of users who categorized the email using rules, percentage of users where the email goes into spam folder, percentage of users who open the email but do not click on any ad link. The resulting KPI from the analytics module 304 is transmitted to the reporting module 306 for aggregation across various users segments and generation of the appropriate reports.

The reporting module 306 receives the raw analytics data from the analytical module 304 and various predefined criteria associated with reporting formats and automatically generates appropriate performance reports 116 for transmission to the advertiser. In an embodiment, additional specifications can be provided to the reporting module 306 including but not limited to, a presentation format for the resulting analytics data, such as text format, graphical format or combinations thereof, a timely schedule for production of the reports, such as but not limited to daily, weekly, monthly or other user-defined schedule. For example, the time spent on the email can be aggregated across the user segments and presented as a histogram by the reporting module 306.

Figure 4:
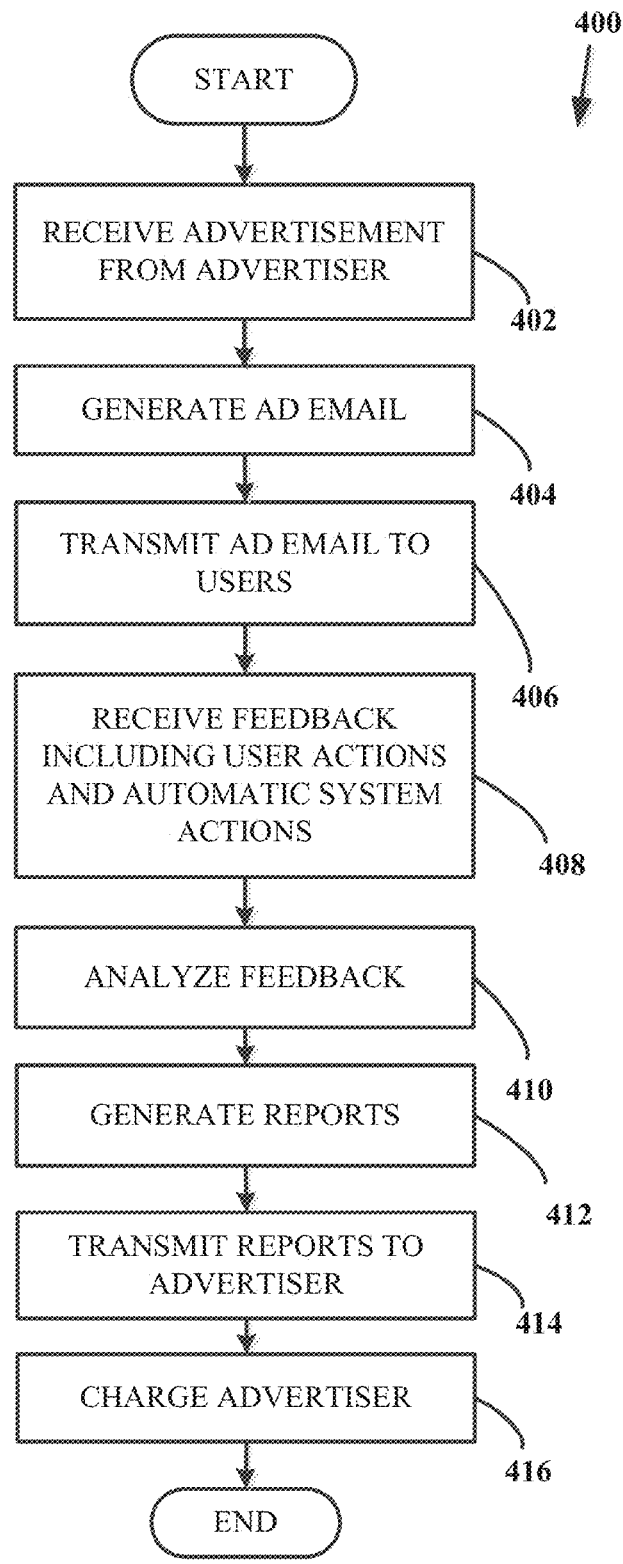
FIG. 4 shows a flowchart that details a method of providing feedback to an advertiser on the performance of an email ad campaign in accordance with one embodiment.

FIG. 4 shows a flowchart 400 that details a method of providing feedback to an advertiser on the performance of an email ad campaign in accordance with one embodiment. The method begins at 402 with receiving an advertisement from the advertiser wherein the advertisement is configured in a format that can be emailed to various current or prospective customers being targeted by the advertiser. In an embodiment, the targeted customers include users who have an email account associated with a domain administered/maintained by an email provider associated with the email system 100. At 404 an email message that is to be transmitted to a plurality of users is configured in accordance with embodiments described herein. The configured email message is transmitted at 406 to the plurality of users of the email system 100 in accordance with embodiments described herein. The feedback from each of the plurality of users who received the email messages 210 is collected at 408. In an embodiment, the feedback collected at 408 can comprise user actions such as but not limited to a user opening a received copy of the email messages 210 and viewing the advertisement 112, selecting a link in the advertisement 112, deleting the copy of the email message or moving the received copy of the email message 210 to one of the system-defined or user-created folders. In an embodiment, the feedback collected at 408 can also include automatic actions by the email system 100 on the received copy of the email message 210 based on the rules defined in a respective email account of each of the plurality of users. At 410, the received feedback is analyzed to determine the key performance indicators (KPI) among the various user segments. By the way of illustration and not limitation, the (KPI) can comprise, percentage of users who delete the email message 210 within five minutes of viewing it, percentage of users who categorize the email message 210, percentage of uses where the email message 210 goes directly to spam, percentage of uses who open but do not check on anything and time spent by the users on the advertisement 112 included in the email message 210. This generalizes data across user segments thereby protecting user privacy as user-specific information is not provided by the email system 100 to the advertisers. At 412 one or more reports summarizing the results of the analysis data obtained at 410 are generated and provided to the advertiser. The provider associated with the email system 100 is thus able to generate funds from transmission of the ad emails 210 to the various users thereby transforming the various email servers that maintain user accounts as revenue resources. This also leads to advertisers being able to receive feedback from the ad emails which enables them to better design their ads based on their targeted user segments. For the users, the methodology described herein leads to them receiving ad emails that are more useful and hence causes them to receive less junk email.

Figure 5:
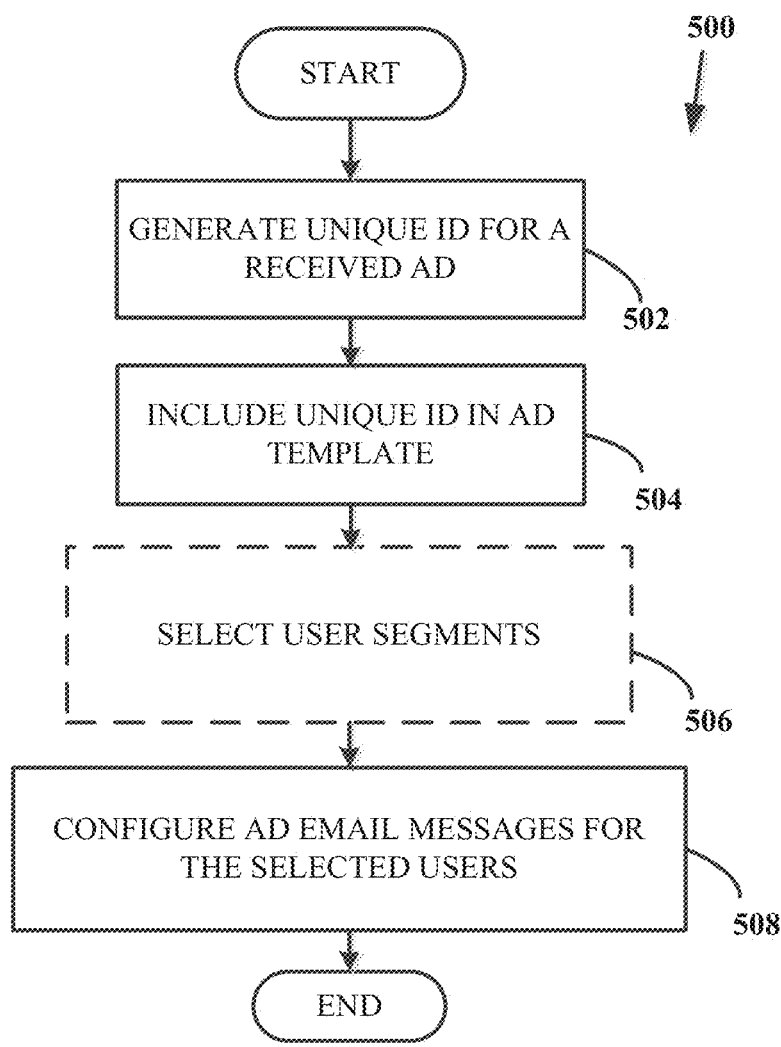
FIG. 5 is a flow chart detailing a method of configuring email messages for transmission to the users in accordance with an embodiment.

FIG. 5 is a flow chart 500 detailing a method of configuring email messages 210 for transmission to the users in accordance with embodiments described herein. When an advertisement 112 for circulating among the users is received by the email system 100 from the advertiser in accordance with embodiments described herein, a unique id is generated for the advertisement as shown at 502. The unique id is incorporated into the ad template as shown at 504. In an embodiment, the unique id can be incorporated into the text of the advertisement 112 so that it is visible to the users receiving the advertisement 112. In an embodiment, the unique id can be incorporated into the markup associated with the advertisement 112 so that the unique id is invisible to the users receiving the ad email messages 210 yet the id can be retrieved from the user logs by the email system 100 when it is necessary to collect and analyze the feedback in accordance with embodiments described herein. At 506 the user segments can be selected for receiving the ad email messages 210. This step can be omitted in an embodiment wherein the ad email messages 210 are transmitted to all the users of the email system 100. Accordingly, the email messages 210 are configured for transmission to the users at 508.

Figure 6:
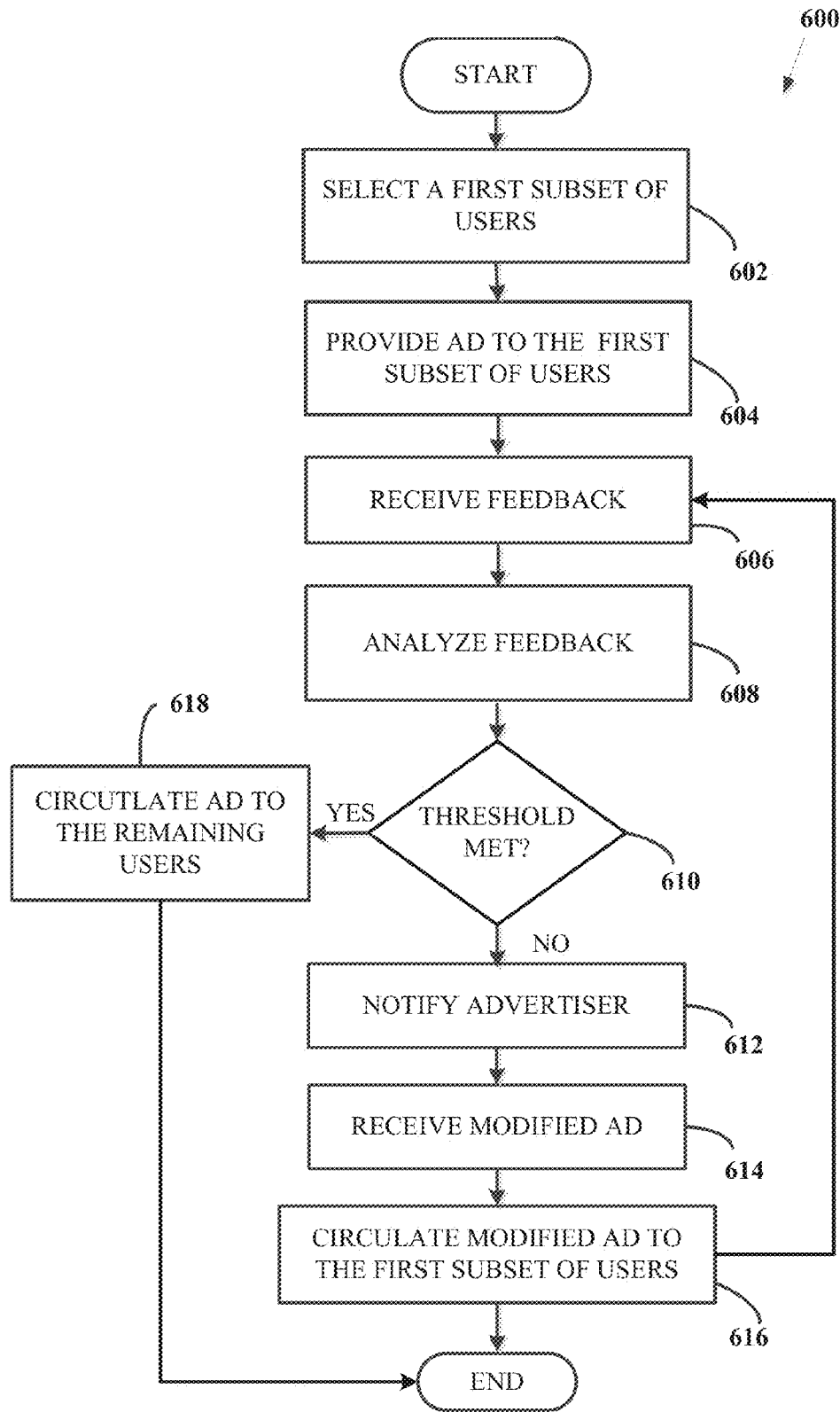
FIG. 6 illustrates a flow chart that shows the details of a method of circulating an advertisement in accordance with an embodiment.

FIG. 6 illustrates a flow chart 600 that shows the details of a method of circulating an advertisement in accordance with one embodiment. The collection and analysis of feedback from the users as described herein facilitates advertisers to stagger the circulation of the advertisements so that more effective ads can be subsequently circulated based on the feedback received from a set of users who receive an initial version of the advertisement. In an embodiment, the first subset of the plurality of users can be randomly selected by the email system 100 at 602. In an embodiment, the advertiser can specify to the email provider at 602, the user segment to whom the advertiser intends to initially target the advertisement 112. The initial version of the advertisement 112 is configured into email messages 210 and provided to a first subset of the plurality of users as shown at 604. The feedback received from the first subset of the users at 606 is analyzed at 608 in accordance with embodiments described herein to determine the key performance indicators (KPI) defined for the advertisement 112. At 610 it is determined if the feedback, or the key performance indicators (KPI) obtained in the feedback meet performance thresholds. In an embodiment, each of the KPI can have a unique performance threshold associated therewith and it is determined if the KPI from the user feedback equals or exceeds the performance threshold at 610. For example, by the way of illustration and not limitation, the advertiser can set one or more thresholds that a certain percentage of users should view the advertisement for at least 4 minutes or that a certain percentage of users should click on a link in the advertisement 112. If the threshold(s) at met at 610, the advertisement 112 is circulated to the remaining users of the plurality of users at 616. If the advertisement 112 does not meet one or more of the performance thresholds at 610, the advertiser is notified at 612. In an embodiment, the results of the feedback obtained at 608 can be provided to the advertiser so that the advertiser can determine which of the KPI the advertisement 112 failed to fulfill and modify the advertisement 112 accordingly. When the modified advertisement is received from the advertiser at 614 it is circulated again among the first subset of users at 616. The feedback from the first subset of users for the modified advertisement is again received at 606, analyzed at 608 and verified if the modified advertisement met the performance thresholds at 610. The method can be repeated until an advertisement that meets the thresholds is finalized for circulation to the remaining users. It may be appreciated that although only one subset of users is described herein, the advertisement 112 can be similarly tested among a plurality of subsets of user segments/buckets simultaneously and statistics can be collected regarding the performance of the advertisement 112 among the user subsets of different user segments. Based on the statistics from the performance feedback, decisions can be made by the advertisers regarding circulating the advertisement 112 among the remaining users of the user segments or further modifying the advertisement to suit preferences of particular user segments in accordance with the embodiments detailed herein.

Figure 7:
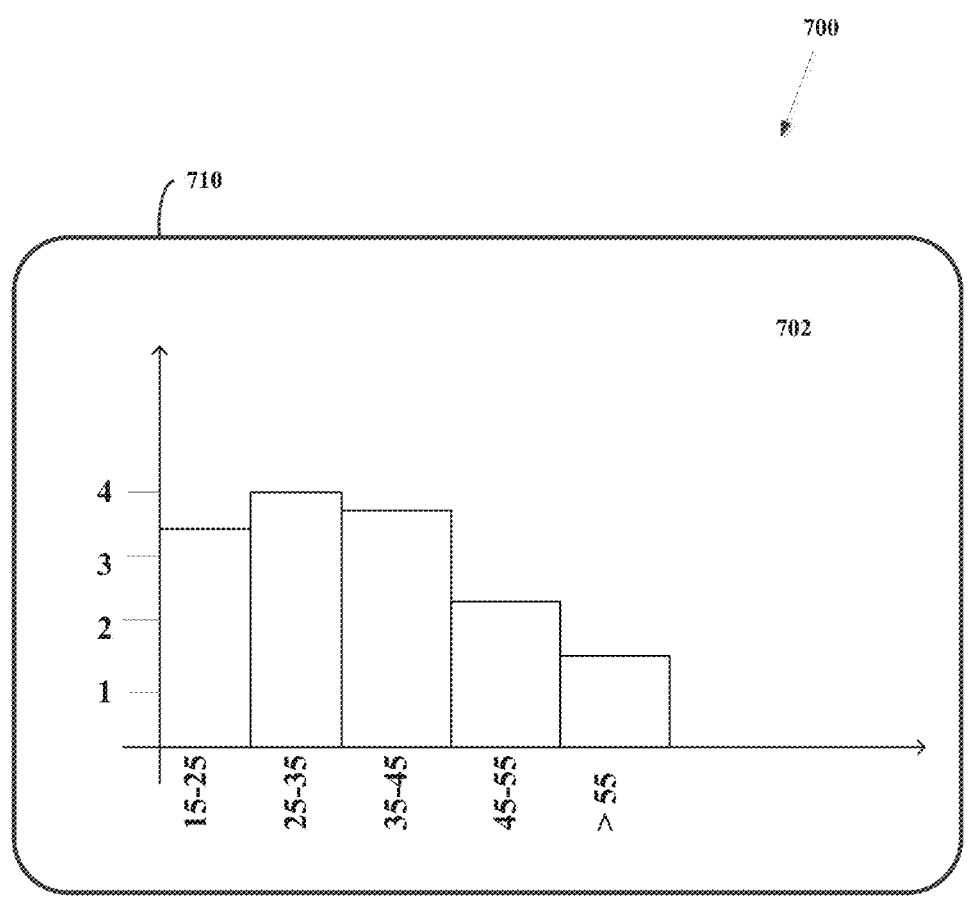
FIG. 7 shows a schematic diagram of a graphical interface that displays the key performance indicators to the advertiser for the advertisement in accordance with an embodiment.
Figure 8:
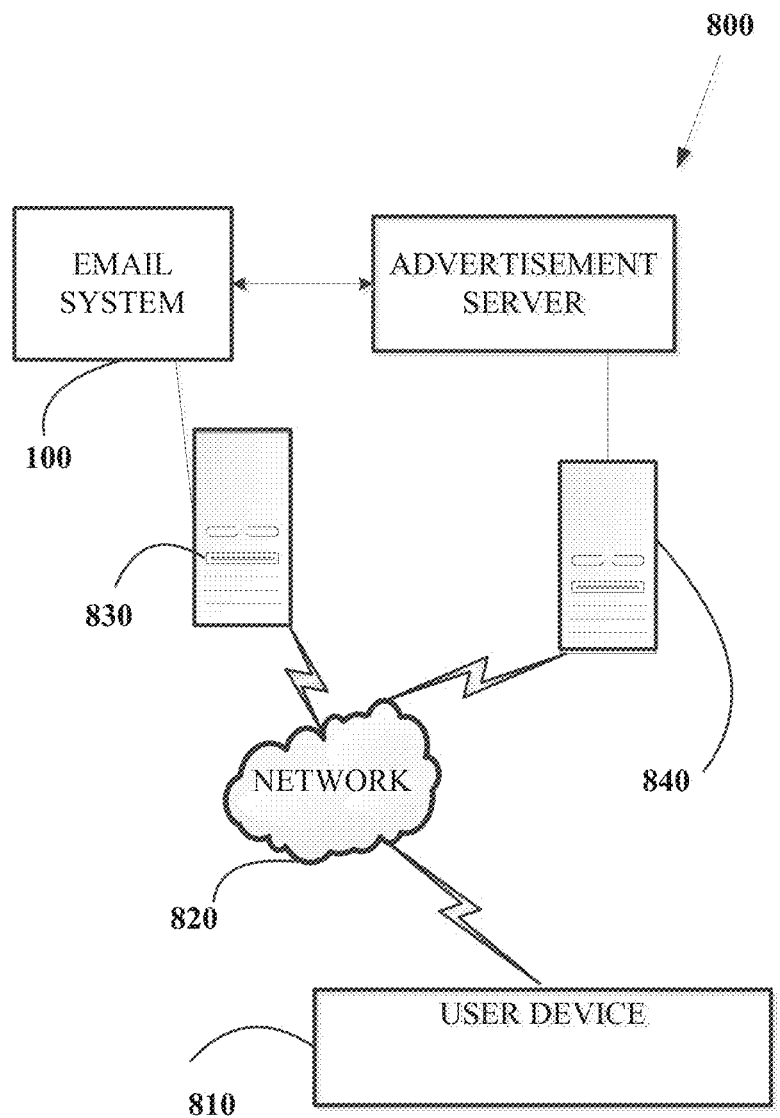
FIG. 8 illustrates a schematic diagram of a system for providing advertisements and collecting feedback related to the advertisements in accordance with an embodiment.

FIG. 7 shows a schematic diagram of a graphical interface 700 that displays the key performance indicators to the advertiser for the advertisement 112 circulated among the plurality of users. It may be appreciated that the graphical interface 700 is only shown be the way of illustration and should not be construed as limiting and that any graphical or text interface can be employed for conveying the results of the feedback analysis in accordance with embodiments described herein. The graphical interface comprising a histogram 702 is displayed on a user device 710 to a user associated with the advertiser. The histogram maps the age of the users who received the advertisement 112 versus the number of minutes the users spent viewing the advertisement. From the histogram the advertiser can conclude that while the advertisement performed satisfactorily with young people in the range of 15-25 years and adults within the age range of 35-45 years, it performed very well with adults between 25-35 years. The histogram 702 indicates that advertisement did not perform well with users aged 45-55 and fared even worse with users aged 55 and older. It may be noted that the viewership metrics are generalized across the various user buckets, no indicia identifying specific users has been provided to the advertiser. Based on the information displayed in the histogram 702, the advertiser can either determine that the advertisement 112 is successful or that it needs to be tweaked further to suit attract certain user segments FIG. 8 illustrates a schematic diagram of a system 800 for providing advertisements and collecting feedback related to the advertisements in accordance with embodiments described herein. The system 800 comprises a server computing apparatus 830 executing the email system 100 in accordance with embodiments described herein. In an embodiment, the advertisement 112 to be emailed to the plurality of users can be directly provided to the email server 830. In an embodiment, the email server 830 is connected to an ad server 840 and a plurality of user devices one of which is 810 via the network 820. The advertisement 112 to be transmitted to the users of the email system 100 is obtained from the ad server 840. The advertisement 112 is configured as an email message 210 in accordance with embodiments described herein and transmitted to the users' email accounts. Shown in FIG. 8 is a user device 810 capable of displaying the email message 210 including the advertisement 112 to the user associated therewith. The feedback related to the message 210 is recorded in the logs of the email server 830 and later analyzed to determine the effectiveness or KPI of the advertisement 112 in accordance with embodiments described herein.

Figure 9:
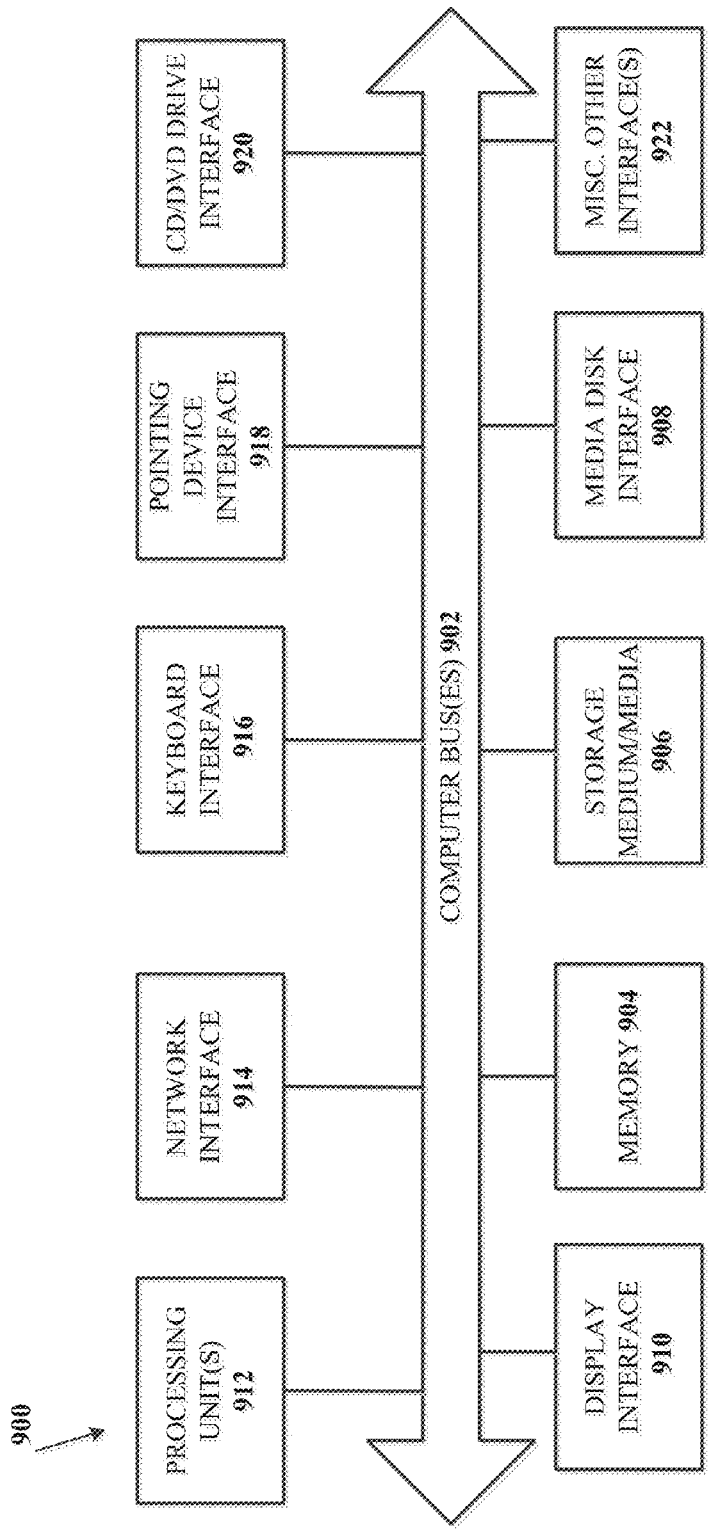
FIG. 9 illustrates internal architecture of a computing device in accordance with embodiments described herein.

As shown in the example of FIG. 9, internal architecture of a computing device 900 includes one or more processing units (also referred to herein as CPUs) 912, which interface with at least one computer bus 902. Also interfacing with computer bus 902 are persistent storage medium/media 906, network interface 914, memory 904, e.g., random access memory (RAM), run-time transient memory, read only memory (ROM), etc., media disk drive interface 908, an interface 920 for a drive that can read and/or write to media including removable media such as floppy, CD-ROM, DVD, etc., media, display interface 910 as interface for a monitor or other display device, keyboard interface 916 as interface for a keyboard, pointing device interface 918 as an interface for a mouse or other pointing device, and miscellaneous other interfaces 922 not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code or logic, and/or computer-executable process steps, incorporating functionality described herein, e.g., one or more of process flows described herein. CPU 912 first loads computer-executable process steps or logic from storage, e.g., memory 904, storage medium/media 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage medium/media 906 is a computer readable storage medium(s) that can be used to store software and data, e.g., an operating system and one or more application programs. Persistent storage medium/media 906 can also be used to store device drivers, such as one or more of a digital camera driver, monitor driver, printer driver, scanner driver, or other device drivers, web pages, content files, metadata, playlists and other files. Persistent storage medium/media 906 can further include program modules and data files used to implement one or more embodiments of the present disclosure.

Figure 10:
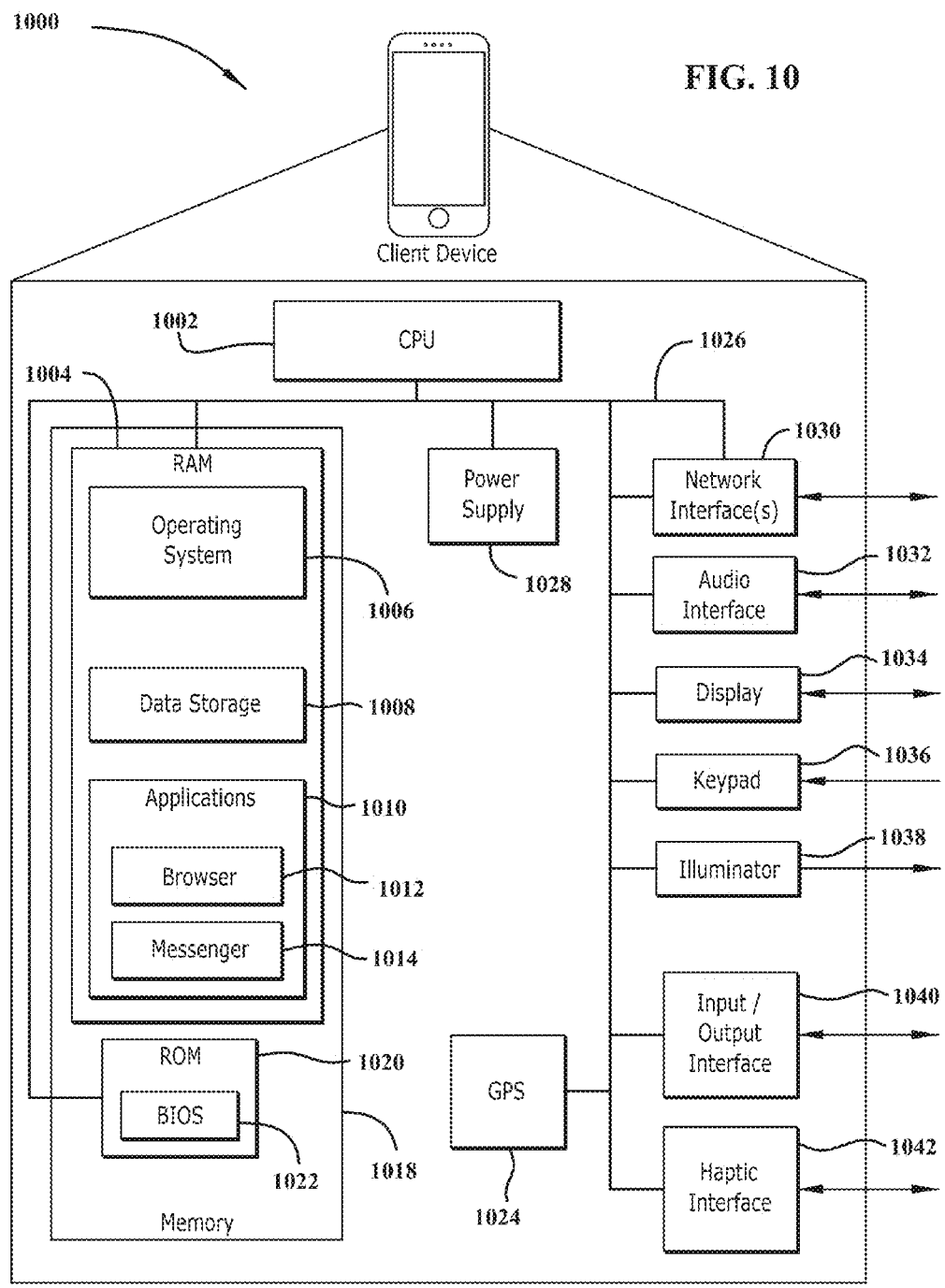
FIG. 10 is a schematic diagram illustrating a client device implementation of a computing device in accordance with embodiments of the present disclosure.

FIG. 10 is a schematic diagram illustrating a client device implementation of a computing device in accordance with embodiments of the present disclosure. A client device 1000 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1002, power supply 1028, a memory 1018, ROM (Read Only Memory) 1020, BIOS (Basic Input Output System) 1022, network interface(s) 1030, audio interface 1032, display 1034, keypad 1036, illuminator 1038, I/O interface 1040 interconnected via circuitry 1026. Claimed subject matter is intended to cover a wide range of potential variations. For example, the keypad 1036 of a cell phone may include a numeric keypad or a display 1034 of limited functionality, such as a monochrome liquid crystal display (LCD) for displaying text. In contrast, however, as another example, a web-enabled client device 1000 may include one or more physical or virtual keyboards 1036, mass storage, one or more accelerometers, one or more gyroscopes, global positioning system (GPS) 1024 or other location identifying type capability, Haptic interface 1042, or a display with a high degree of functionality, such as a touch-sensitive color 2D or 3D display, for example. The memory 1018 can include Random Access Memory 1004 including an area for data storage 1008.

A client device 1000 may include or may execute a variety of operating systems 1006, including a personal computer operating system, such as a Windows, iOS or Linux, or a mobile operating system, such as iOS, Android, or Windows Mobile, or the like. A client device 1000 may include or may execute a variety of possible applications 1010, such as a client software application 1014 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1000 may also include or execute an application to communicate content, such as, for example, textual content, multimedia content, or the like. A client device 1000 may also include or execute applications 1010 to perform a variety of possible tasks, such as for browsing 1012, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
receiving, at an email server associated with an email platform, a plurality of electronic mail messages (emails), each comprising a digital content object from a third party, each email communicated to the email server for delivery to at least one of a plurality of users, said digital content object comprising digital content associated with content provided by the third party;

automatically analyzing, upon reception of each email and prior to delivery of each email, via the email server, each email, and based on said analysis, identifying the digital content comprised in each message, said analysis further comprising classifying, via the email server, each email upon reception and prior to delivery based on each email's respective identified digital content;

communicating, via the email server, each email to an inbox associated with each of the plurality of users hosted by said email platform based on said analysis and classification;

detecting, by the email server, upon delivery of each communicated email, feedback associated with the digital content object for each email based on the classification determined prior to delivery of each email and performed on each email upon said delivery in said inbox of each user on said email platform;

identifying, by the email server, a plurality of user segments from the plurality of users, said identification comprising analyzing attributes of each user in said plurality of users and determining which users share common attributes, said identification further comprising automatically forming said user segments such that the users that share common attributes are within a particular user segment;

identifying, by the email server, the feedback for each user in each identified user segment;

mapping, by the email server, the identified feedback of each user segment to the attributes of each user in a respective user segment by generating a histogram between the feedback and the attributes for each user, said generated histogram comprising an electronic representation of how the feedback for a respective user segment corresponds to the attributes of the users in the user segment;

automatically generating, by the email server, a report for each user segment based on said mapping and generation of the histogram;

communicating, via the email server, a generated electronic message to the third party comprising each generated report; and automatically communicating, via the email server, another set of emails to a set of users comprising another digital content item identified based on the information in the generated electronic message.

2. The method of claim 1, further comprising:
generating, by the email server, a unique id for the digital content object.

3. The method of claim 2, further comprising:
inserting, by the email server, the unique id into the digital content object such that each of the emails sent to the plurality of the users comprise the unique id.

4. The method of claim 1, wherein detecting classification of the email further comprises:
detecting, by the email server, a respective folder in each user's email account that the digital content object is automatically placed into by the email server upon receipt.

5. The method of claim 1, wherein detecting feedback further comprises:
detecting, by the email server, at least one user action on an email comprising the digital content object.

6. The method of claim 1, further comprising:
receiving, by the email server, revenue from the third party for the generated reports.

7. The method of claim 1, wherein the plurality of users is a subset of users of the email platform that are to receive the digital content object.

8. The method of claim 1, further comprising:
determining, by the email server, if at least one key performance indicator (KPI) associated with the digital content object equals or exceeds a performance threshold.

9. The method of claim 8, further comprising:
receiving, by the email server, a modified version of the digital content object if the key performance indicator does not equal or exceed the threshold;
transmitting, by the email server, the modified version to the plurality of users;
collecting, by the email server, feedback for the modified version from the plurality of users;
determining, by the email server, if the at least one key performance indicator equals or exceeds the threshold for the modified version.

10. The method of claim 9, further comprising:
transmitting, by the email server, the modified version to the users of the email platform other than the subset if the at least one key performance indicator equals or exceed the threshold for the modified version.

11. An email server comprising:
at least one processor; and
a non-transitory computer-readable storage medium for tangibly storing thereon program logic for execution by the processor, the program logic comprising:
logic executed by the processor for receiving, at the email server that is associated with an email platform, a plurality of electronic mail messages (emails), each comprising a digital content object from a third party, each email communicated to the email server for delivery to one of a plurality of users, said digital content object comprising digital content associated with content provided by the third party;
logic executed by the processor for automatically analyzing, upon reception of each email and prior to delivery of each email, via the email server, each email, and based on said analysis, identifying the digital content comprised in each message, said analysis further comprising classifying, via the email server, each email upon reception and prior to delivery based on each email's respective identified digital content;
logic executed by the processor for communicating, via the email server, each email to an inbox associated with each of the plurality of users hosted by said email platform based on said analysis and classification;
logic executed by the processor for detecting, by the email server, upon delivery of each communicated email, feedback associated with the digital content object for each email based on the classification determined prior to delivery of each email and performed on each email upon said delivery in said inbox of each user on said email platform;
logic executed by the processor for identifying, by the email server, a plurality of user segments from the plurality of users, said identification comprising analyzing attributes of each user in said plurality of users and determining which users share common attributes, said identification further comprising automatically forming said user segments such that the users that share common attributes are within a particular user segment;

logic executed by the processor for identifying, by the email server, the feedback for each user in each identified user segment;

logic executed by the processor for mapping, by the email server, the identified feedback of each user segment to the attributes of each user in a respective user segment by generating a histogram between the feedback and the attributes for each user, said generated histogram comprising an electronic representation of how the feedback for a respective user segment corresponds to the attributes of the users in the user segment;

logic executed by the processor for automatically generating, by the email server, a report for each user segment based on said mapping and generation of the histogram;

logic executed by the processor for communicating, via the email server, a generated electronic message to the third party comprising each generated report; and logic executed by the processor for automatically communicating another set of emails to a set of users comprising another digital content item identified based on the information in the generated electronic message.

12. The email server of claim 11, further comprising:
generating logic, executed by the processor, for generating a unique id for the digital content object.

13. The email server of claim 12, further comprising:
id inserting logic, executed by the processor, for inserting the unique id into the digital content object such that each of the emails sent to the plurality of the users comprises the unique id.

14. The email server of claim 11, wherein detecting classification of the email further comprises:
folder detecting logic, executed by the processor, for detecting a respective folder in each of the users' email account that the digital content object is automatically placed into upon receipt by the email server.

15. The email server of claim 11, further comprising:
revenue receiving logic, executed by the processor, for receiving revenue from the third party for the generated reports.

16. A non-transitory computer readable storage medium tangibly encoded with computer-executable instructions, that when executed by a processor of an email server, perform a method comprising:
receiving, at the email server that is associated with an email platform, a plurality of electronic mail messages (emails), each comprising a digital content object from a third party, each email communicated to the email server for delivery to one of a plurality of users, said digital content object comprising digital content associated with content provided by the third party;
automatically analyzing, upon reception of each email and prior to delivery of each email, via the email server, each email, and based on said analysis, identifying the digital content comprised in each message, said analysis further comprising classifying, via the email server, each email upon reception and prior to delivery based on each email's respective identified digital content;
communicating, via the email server, each email to an inbox associated with each of the plurality of users hosted by said email platform based on said analysis and classification;
detecting, by the email server, upon delivery of each communicated email, feedback associated with the digital content object for each email based on the classification determined prior to delivery of each email and performed on each email upon said delivery in said inbox of each user on said email platform
identifying, by the email server, a plurality of user segments from the plurality of users, said identification comprising analyzing attributes of each user in said plurality of users and determining which users share common attributes, said identification further comprising automatically forming said user segments such that the users that share common attributes are within a particular user segment;
identifying, by the email server, the feedback for each user in each identified user segment;
mapping, by the email server, the identified feedback of each user segment to the attributes of each user in a respective user segment by generating a histogram between the feedback and the attributes for each user, said generated histogram comprising an electronic representation of how the feedback for a respective user segment corresponds to the attributes of the users in the user segment;
automatically generating, by the email server, a report for each user segment based on said mapping and generation of the histogram;
communicating, via the email server, a generated electronic message to the third party comprising each generated report; and
automatically communicating, via the email server, another set of emails to a set of users comprising another digital content item identified based on the information in the generated electronic message.

17. The non-transitory computer readable medium of claim 16, further comprising:
generating a unique id for the digital content object.

18. The non-transitory computer readable medium of claim 17, further comprising:
inserting the unique id into the digital content object such that each of the emails sent to the plurality of the users comprises the unique id.

19. The non-transitory computer readable medium of claim 16, further comprising:
detecting a respective folder in each of the users' email account that the digital content object automatically is placed into by the email server upon receipt.

20. The non-transitory computer readable medium of claim 16, further comprising:
receive revenue from the third party for the generated reports.

* * * * *